United States Patent [19]

Borsuk et al.

[11] Patent Number: 4,599,025
[45] Date of Patent: Jul. 8, 1986

[54] STACKER ASSEMBLY

[75] Inventors: Alvin Borsuk, Madison; Timothy G. Mally, Oregon; James A. Rattmann, Sun Prairie, all of Wis.

[73] Assignee: Oscar Mayer Foods Corporation, Madison, Wis.

[21] Appl. No.: 600,722

[22] Filed: Apr. 16, 1984

[51] Int. Cl.[4] .............................................. B65G 57/10
[52] U.S. Cl. ...................................... 414/82; 198/436; 198/468.9; 414/51
[58] Field of Search ............... 198/436, 448, 457, 485, 198/468.9; 414/45, 51, 82, 85, 87

[56] References Cited

U.S. PATENT DOCUMENTS 4,255,074 3/1981 Meratti et al. .................. 198/485 X
4,349,097 9/1982 Curti ............................... 198/436 X Primary Examiner—Robert J. Spar
Assistant Examiner—Janice Krizek
Attorney, Agent, or Firm—Joseph T. Harcarik; Thomas R. Savoie; Daniel J. Donovan

[57] ABSTRACT

A stacker assembly is provided that removes a product from a conveyor moving a flow of spaced products and that transfers such products to a discharge assembly. A plurality of products are deposited in this manner onto the discharge assembly until a stack of products having a desired size is formed. A product lifter assembly is included that passes through spacings in the conveyor in order to raise the product above the conveyor, and a comb assembly passes through spacings of the product lifter in order to subsequently receive the raised product for transfer to the discharge assembly.

10 Claims, 9 Drawing Figures

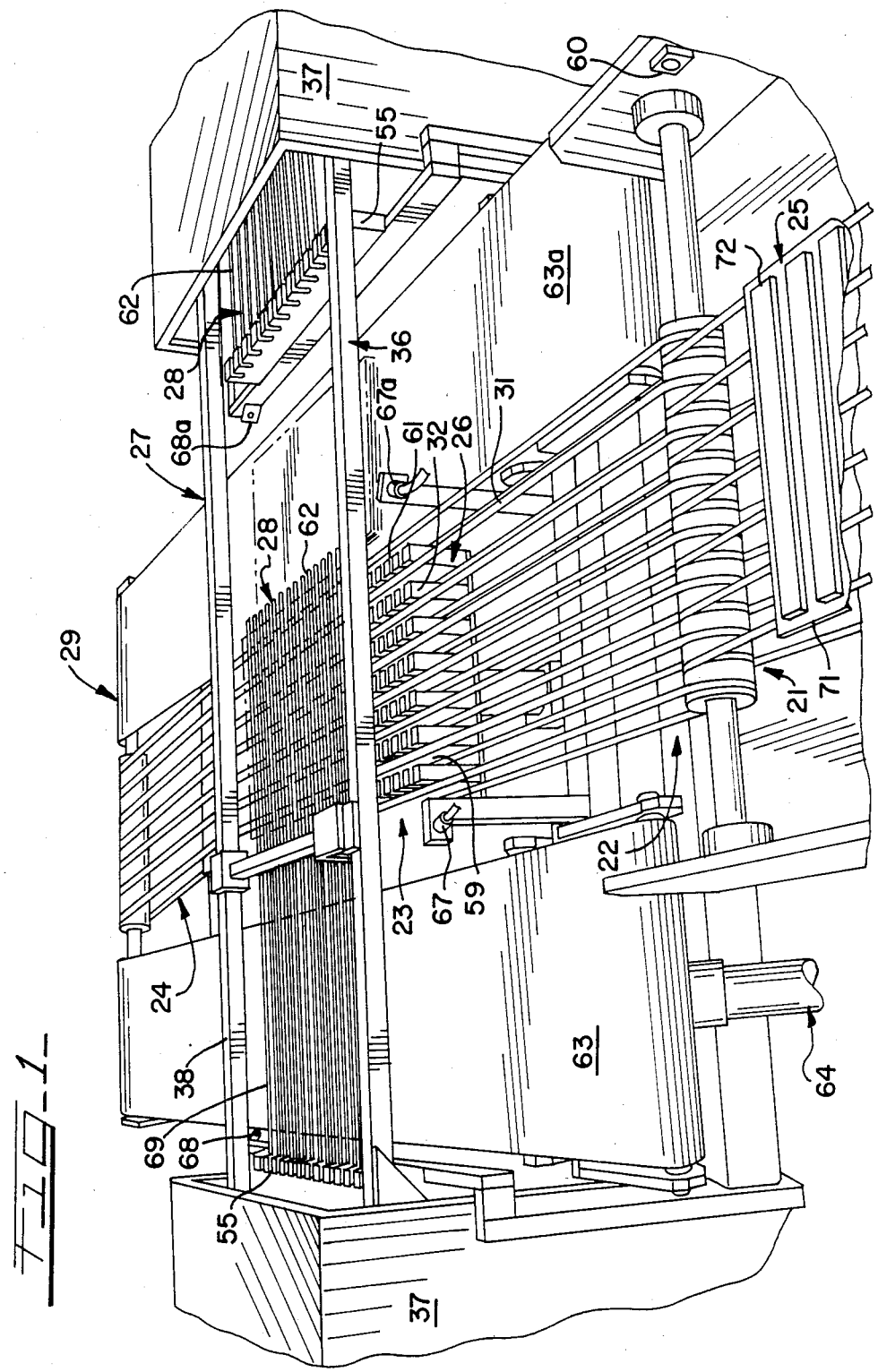

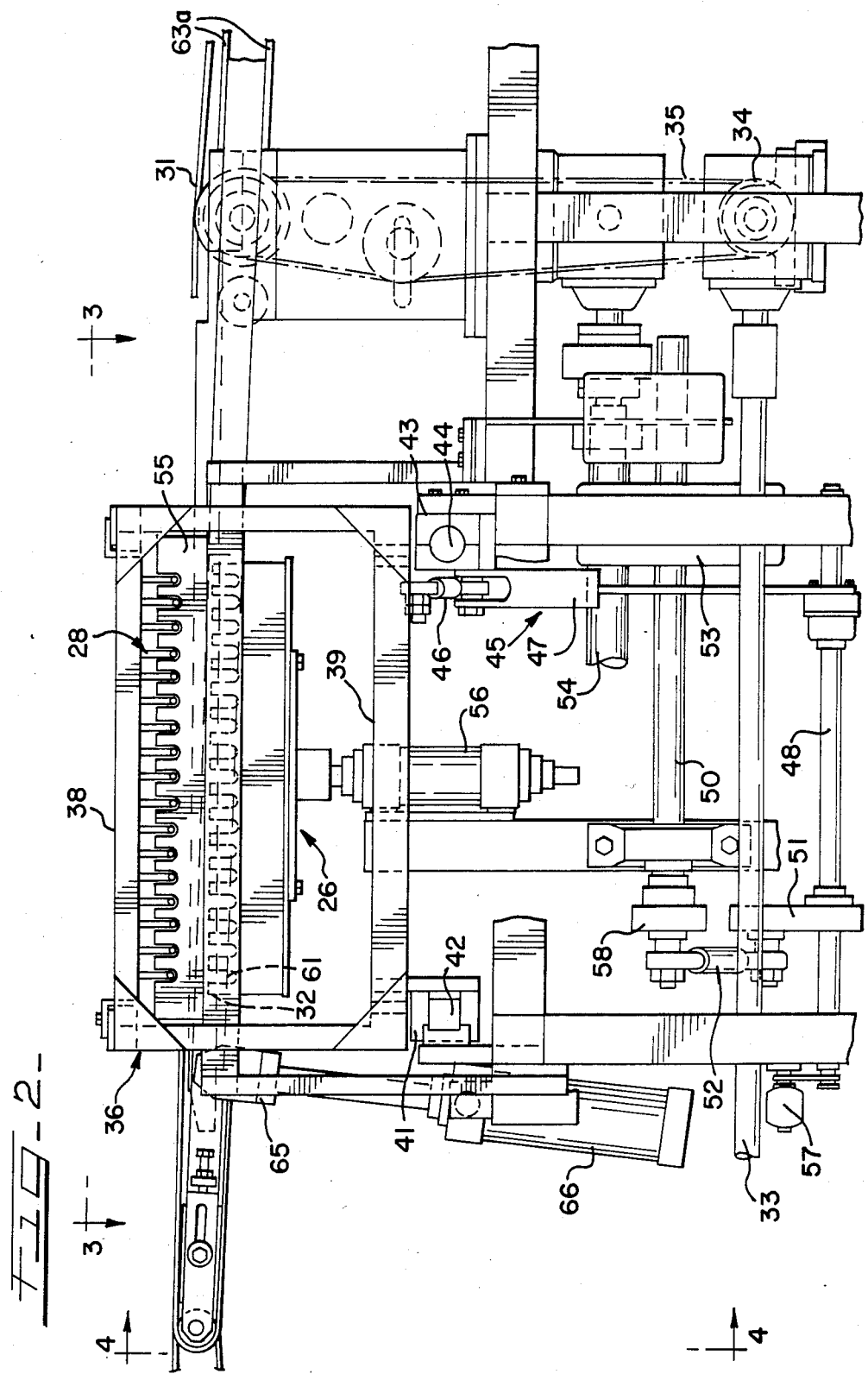

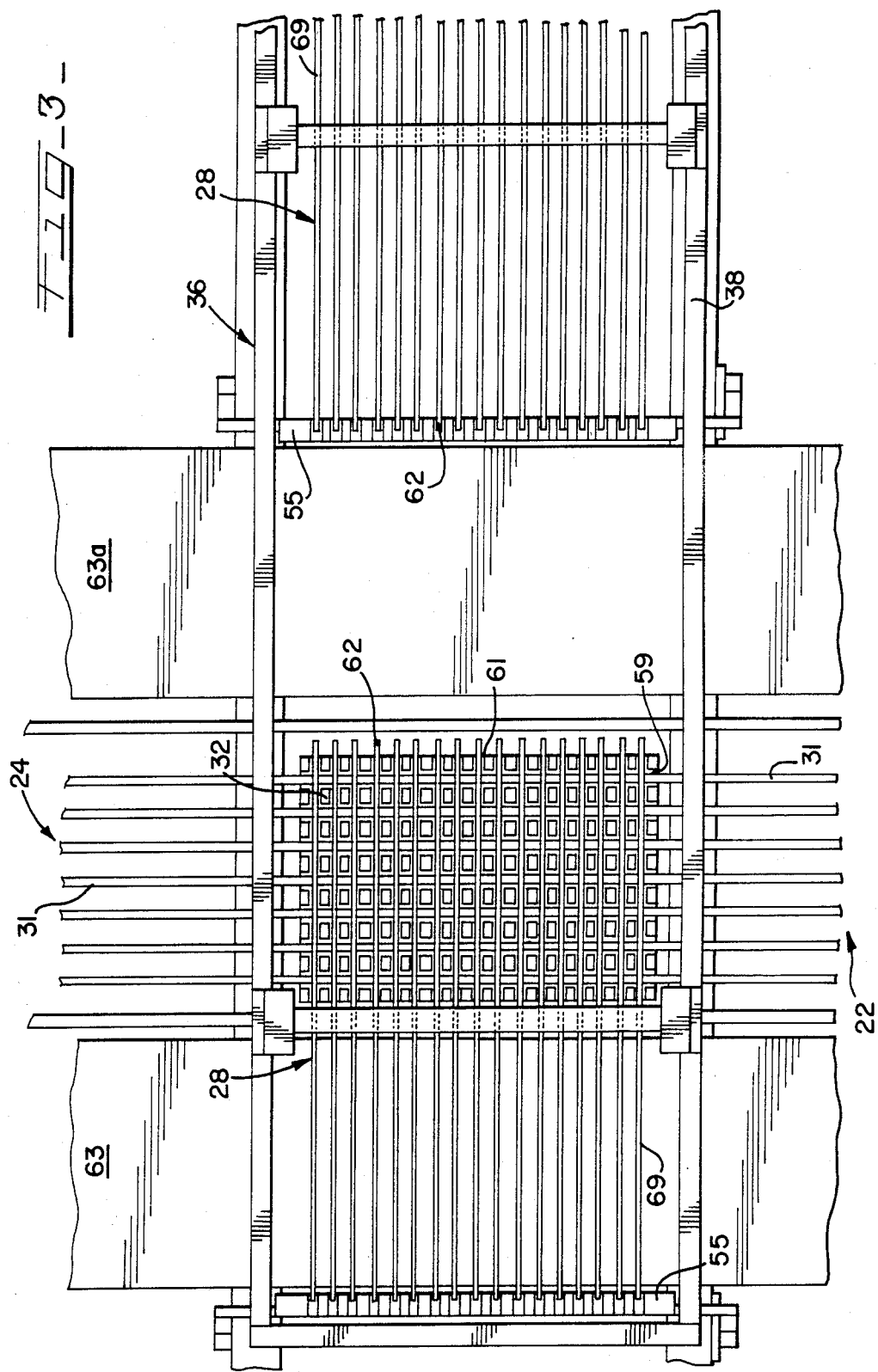

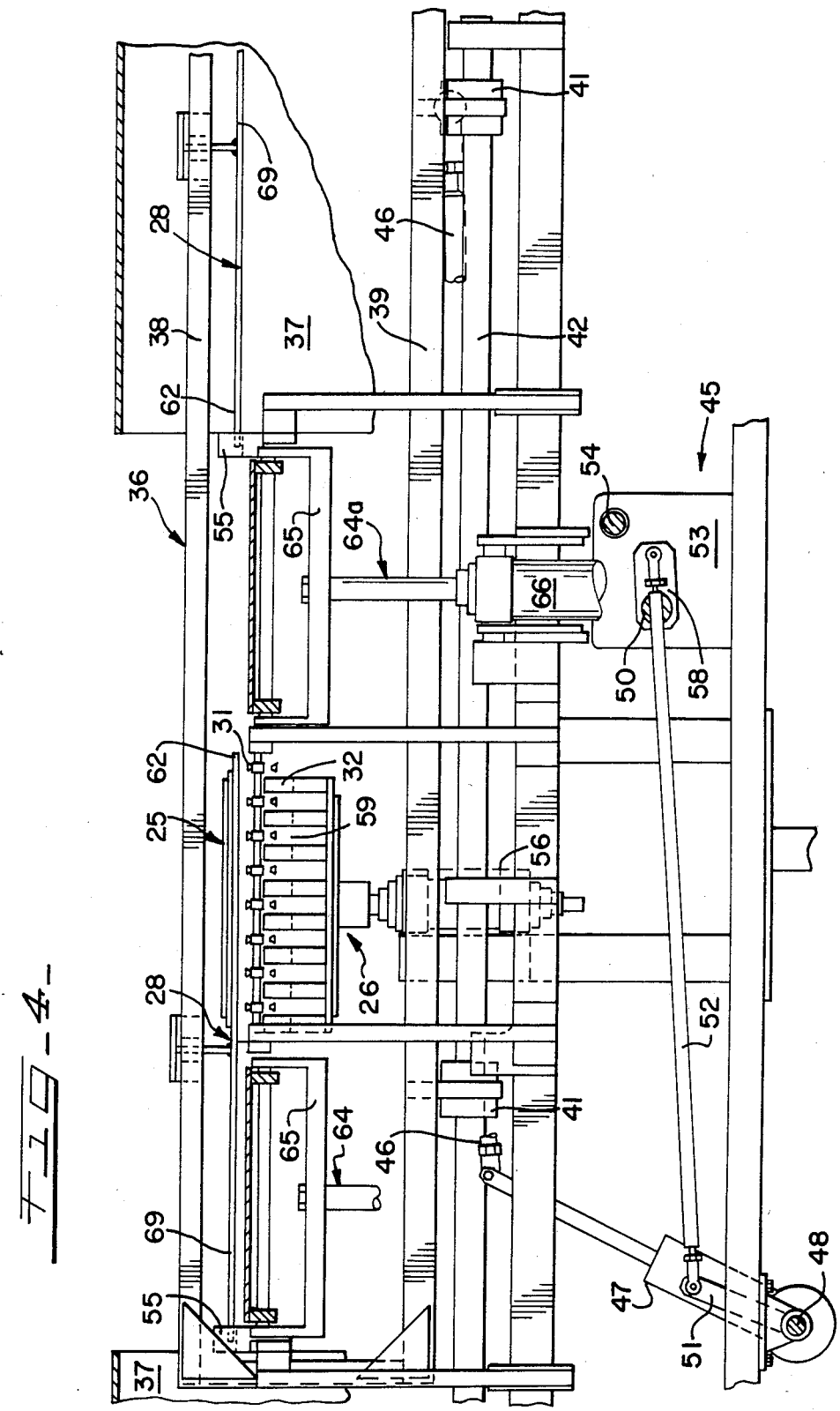

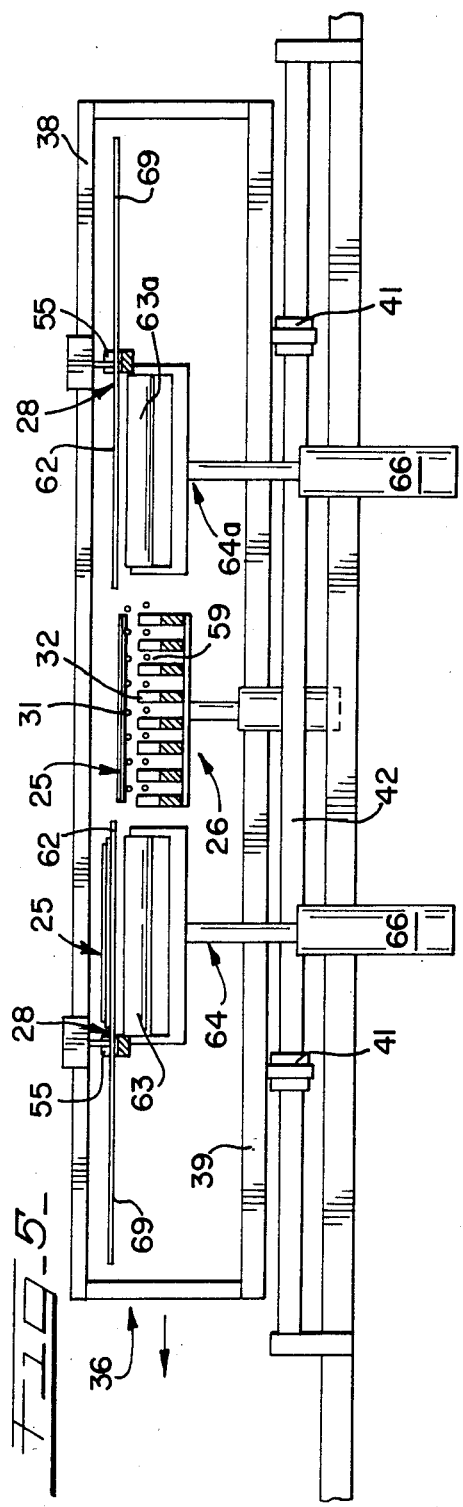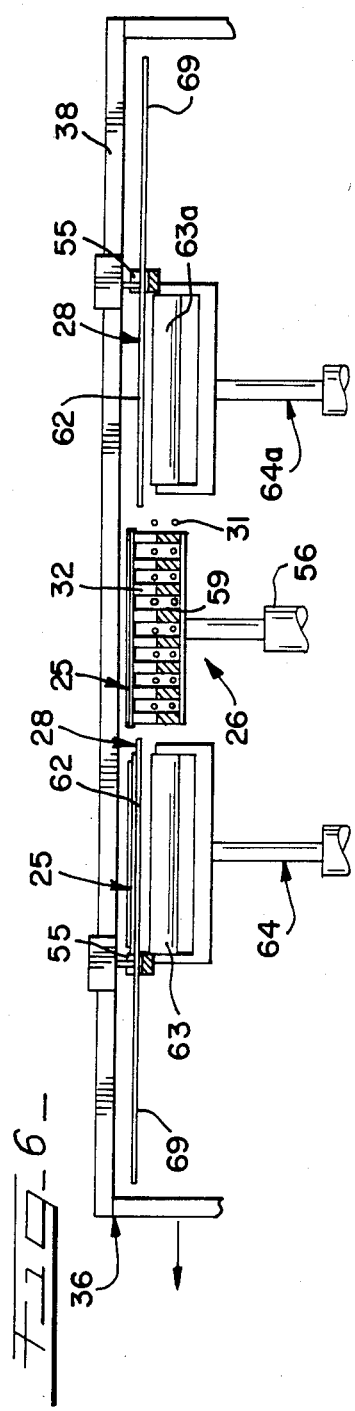

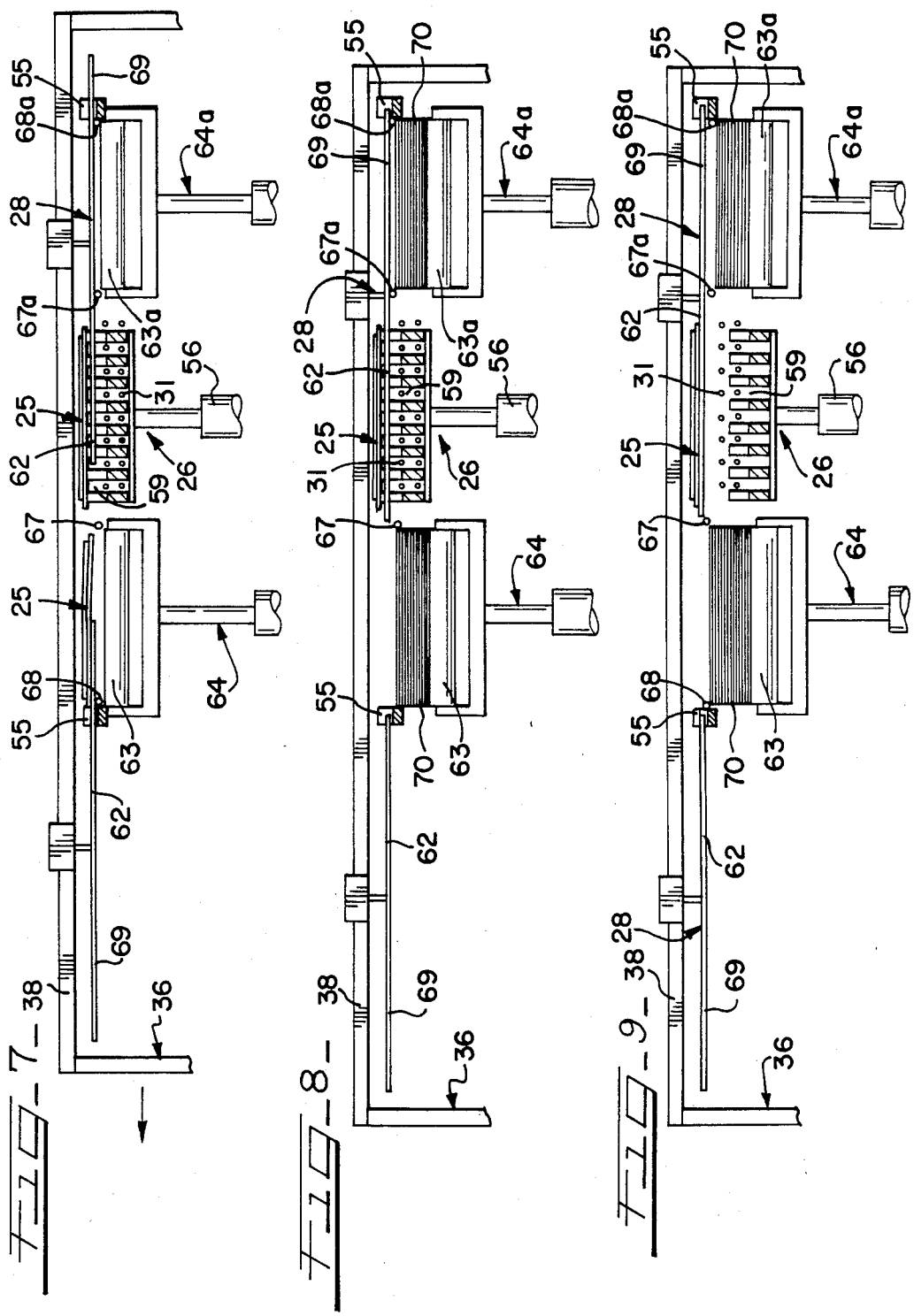

STACKER ASSEMBLY

DESCRIPTION

This invention generally relates to the stacking of products, more particularly to the stacking of conveyed products into multiple-product stacks, whereby products are lifted from the conveyed pathway and moved to an adjoining location where the stacking function is performed. Preferably, in order to substantially double the flow capacity of the stacker assembly, dual discharge conveyors are provided, and the stacking function is carried out on each of the discharge conveyors in order to form dual stacks of product by alternate movement of product from the conveyed pathway to one discharge conveyor location or to another discharge conveyor location. The invention is particularly suitable for stacking food products such as ones in which slices of bacon or the like are aligned in side-by-side, spaced or overlapping relationship with each other on top of a packaging substrate such as a sheet of paper or the like.

Many types of products that are processed along a conveyor pathway must be stacked one on top of another for packaging, subsequent handling or treatment or the like. Special problems arise when the products being stacked are sheet products or are otherwise susceptible to disruption or damage if they are, for example, moved too rapidly or too unevenly during the stacking procedure. Additionally, when stacking is carried out at a downstream portion of a conveyor line, it is important that the stacker be able to keep pace with the flow of products to be stacked.

The present invention responds to these needs by providing a conveyor assembly for receiving a stream of spaced sheet products or the like, for lifting each spaced product off of the conveyor assembly when the conveyor assembly is stopped, for transferring the lifted product to, and forming product stacks at, a stacking area generally adjacent to the conveyor assembly, and for subsequently moving thus formed product stacks from the stacking location. The apparatus includes a sheet lifter that moves through the conveyor assembly and that lifts the products off of the stopped conveyor assembly. A stacking comb slides through the sheet lifter and below the lifted product, after which the product is deposited onto the stacking comb, followed by movement of the product by the stacking comb to the stacking area, which is typically on a discharge conveyor that conveys completed product stacks from the stacking area to the location of a subsequent operation, such as packaging or the like.

It is accordingly a general object of the present invention to provide an improved stacker apparatus and method for forming stacks of products from a conveyed stream of products.

Another object of this invention is to provide an improved stacking apparatus and method that is especially suitable for sheet products and that maintains the products in a generally horizontal attitude throughout a sequence of stacking steps.

Another object of the present invention is to provide an improved apparatus and method for stacking which supports each product being stacked through various phases of the stacking operation, which support is spaced along substantially the entire bottom surface of the product.

Another object of the present invention is to provide an improved apparatus and method for stacking one sheet of bacon slices onto another sheet of bacon slices.

Another object of this invention is to provide an improved stacking method and apparatus for forming dual stacks of products from a single flow of spaced and conveyed products These and other objects of the present invention will be apparent from the following description of the invention, taken in conjunction with the accompanying drawings, wherein:

FIG. 1 is a perspective view of the preferred apparatus and method according to this invention;

FIG. 2 is a side elevational view of the apparatus generally illustrated in FIG. 1;

FIG. 3 is a top plan view generally along the line 3-3 of FIG. 2;

FIG. 4 is a front end elevational view generally along the line 4—4 of FIG. 2;

FIG. 5 is a schematic illustration of a front end view similar to FIG. 4, in which the feed conveyor is stopped and a product thereon is positioned above the lifter;

FIG. 6 is a schematic view illustrating a step subsequent to that of FIG. 5, during which the lifter raises the product off of the conveyor assembly;

FIG. 7 is a schematic view illustrating a step subsequent to that of FIG. 6, wherein a stacking comb is being positioned under the lifted product, and another product is being deposited at a stacking location;

FIG. 8 is a schematic illustration of the assembly after the stacking comb has completed its movement under the product, and after the other product has been completely deposited; and FIG. 9 is a schematic illustration of an operation subsequent to that of FIG. 8 wherein the lifter has dropped, and the product rests on the stacking comb.

The stacking assembly that is generally illustrated in FIG. 1 includes a conveyor assembly, generally designated as 21, having an on-feed portion 22, a transfer portion 23, and a pass-through portion 24. Products, generally designated as 25, are conveyed by the conveyor assembly 21, from its on-feed portion 22 toward its transfer portion 23. A lifter assembly, generally indicated at 26, is in general vertical alignment with the transfer portion 23 of the conveyor assembly 21, while a stacking comb assembly, generally indicated at 27, is positioned above the transfer portion 23 and includes comb assemblies 28 that move with the stacking comb assembly 27 between a location above the transfer portion 23 to a discharge location, such as the illustrated discharge conveyor assembly, generally designated as 29.

Stacking is generally carried out as follows. A product 25, which may be a sheet product as illustrated, is conveyed to and stopped at the transfer portion 23 of the conveyor assembly 21. While the comb assemblies 28 straddle the transfer portion 23 (illustrated in FIG. 5), the lifter assembly 26 raises this product 25 above the transfer portion 23 to a height greater than the top surface of the comb assemblies 28 (illustrated in FIG. 6). Thereafter, one of the comb assemblies 28 is positioned under the thus elevated product 25 (illustrated in FIGS. 7 and 8), the lifter assembly 26 drops, and this product 25 rests on this comb assembly 28 (illustrated in FIG. 9). Next, the stacking comb assembly 27 moves this product 25 to a location above the discharge conveyor assembly 29, and the product 25 is stripped off of the comb assembly 28 and onto the discharge conveyor assembly 29. Stacking occurs when this operation is repeated, and another product 25 is deposited on top of the product that was previously deposited onto the discharge conveyor assembly 29. When a stack having the desired number of products 25 is formed, it is moved to a downstream location by operation of the discharge conveyor assembly 29.

Lifter assembly 26 includes an array of spaced upstanding portions 32 that are longitudinally spaced from each other in a pattern that is adequate to accommodate passage of belts 31 of the conveyor assembly 21 therethrough. This array of upstanding portions 32 also includes transverse spaces in order to accommodate passage of the comb assemblies 28 therethrough. Conveyor assembly 21 includes a suitable drive mechanism, including components such as the drive shaft 33, drive pulley assembly 34 and drive chain or belt 35, all illustrated in FIG. 2.

In the preferred embodiment illustrated, the stacking comb assembly 27 oscillates such that its shuttle frame or carriage 36 and the comb assemblies 28 mounted thereon generally oscillate into and out of respective protective covers 37. Carriage 36 includes an upper frame assembly 38 from which the comb assemblies 28 are suspended, as well as a lower frame assembly 39. The entire carriage 36 is slidably mounted by the lower frame assembly 39 to slide bracket assemblies 41 or the like which move along a guide rail 42 (FIG. 4). The lower frame assembly 39 also is in operative interengagement with a slide actuator assembly 43, which is slidingly mounted along a guide rod 44 (FIG. 2). Slide actuator assembly 43 is moved by a suitable oscillating drive assembly, generally designated as 45.

Oscillating drive assembly 45 of the illustrated embodiment includes a push rod 46 (FIG. 2 and FIG. 4, partially broken away) that is pivotally mounted at one end for slidable engagement with the lower frame assembly 39 of the carriage 36. The other end of the push rod 46 is pivotally connected to a long actuator arm 47 which is secured to an oscillator shaft 48. As best seen in FIG. 4, one end of a crank 51 is rotatably secured to the oscillator shaft 48 while the other end of the crank 51 is rotatably secured to a push rod 52. Push rod 52 is mounted through a short crank arm 58 to a shaft 50 which is driven by an intermittent motion mechanism 53 of previously known construction. The intermittent motion mechanism 53 translates the typically constant speed rotation of a main drive shaft 54 into a defined pattern of rotational movement of the shaft 50, which defined pattern includes intermittent positive acceleration, negative acceleration, constant velocity, at-rest, and directional change segments. Generally speaking, the oscillating drive assembly 45 drives the shuttle frame or carriage 36 through the defined oscillating pattern.

With more particular reference to the defined oscillating pattern of the shuttle frame or carriage 36, FIG. 4 illustrates the position of the carriage 36 at its rightwardmost orientation, the carriage 36 being at rest and at the point that the carriage 36 is changing the direction of its movement. Preferably, initial movement toward the left is at a positive acceleration that is slow enough to preclude disturbance of the product 25 resting on the left comb assembly 28, this slow positive acceleration continuing until the carriage 36 has traversed a path length that is equal to approximately one-half of the width of the product 25, preferably slightly greater than one-half the width of the product 25.

Next, while the carriage 36 is still moving toward the left, negative acceleration of substantially the same magnitude as said slow positive acceleration is carried out for approximately one-half the width of the product 25, typically slightly greater than one-half the width thereof. Such negative slow acceleration is completed by the time that the carriage 36 reaches the position illustrated in FIG. 5, at which time the product 25 is at a position just before it engages a fixed stripper bar 55. Preferably, just prior to such engagement, during this engagement and shortly thereafter, the carriage 36 is moving at a slow velocity. This slow velocity that immediately precedes and continues during the initial, brief time of contact between the leading edge of the product 25 and the stripper bar 55 is slow enough so as to minimize the possibility of any disturbance of or damage to the particular product 25 being stacked.

At this point, the product 25 is no longer moving with the carriage 36, a substantially static condition having been imparted to the product 25 by the stripper bar 55. Once this static condition is fully established, which typically occurs shortly after initial contact, the carriage 36 is positively accelerated at a rapid rate which is greater than the previously described slow acceleration. This rapid positive acceleration continues until the carriage 36 reaches the location that is generally illustrated in FIG. 7 wherein the carriage 36 has moved a distance approximately one-half the width of the product 25 since initial engagement of the product 25 and the fixed stripper bar 55, at which time the product 25 is approximately one-half removed from the comb assembly 28. At the time that this point in the oscillating pattern is reached, negative acceleration of the carriage 36 is initiated, such negative acceleration being a rapid acceleration that is of substantially the same magnitude as the rapid positive acceleration. This rapid negative acceleration is completed, and the carriage 36 is substantially at rest, when the oscillating orientation illustrated in FIG. 8 has been reached.

The magnitude of this rapid positive and negative acceleration is great enough so that the product 25 in its static state during its engagement with the stripper bar 55 is not significantly disturbed or damaged when it falls the distance between the comb assembly 28 and the discharge conveyor 29 or product(s) 25 stacked thereupon. In the case of an especially flexible product, such as bacon slices resting on a sheet of paper, the rate of relative movement between the comb assembly 28 and the static product 25 should be fast enough to minimize excessive bending or rippling of the product 25. Provided the magnitude of the rapid acceleration of the carriage 36 is great enough, even an extremely flexible product 25 will drop substantially as a unit from the comb assembly 28 onto the discharge conveyor 29 or product(s) 25 stacked thereon.

Oscillating movement of the carriage 36 toward the right follows the same pattern as that described herein for oscillating movement toward the left. More particularly, the oscillating movement sequentially moves from the at-rest leftwardmost orientation of FIG. 9 to a positive slow acceleration, followed by a negative slow acceleration, then a short period of movement at a slow velocity, after which the carriage 36 rapidly accelerates, rapidly decelerates, and then returns to the at-rest, rightwardmost position shown in FIG. 4.

Lifter assembly 26 includes a mechanism for raising and lowering the upstanding portions 32 thereof, such as the illustrated rod and piston assembly 56. A suitable timing system is provided in order to raise and lower the upstanding portions 32 at the appropriate times during the previously described oscillating pattern of the carriage 36. Rotary cam switch 57 (FIG. 2) of known construction is provided in this regard in the illustrated embodiment, such rotary cam switch 57 being run off of the oscillator shaft 48 in order to provide signals that are in sequence with movement of the carriage 36. It will be appreciated that other arrangements, such as the use of appropriately positioned limit switches can be substituted therefor.

If desired, this timing system can include an arrangement to provide a "product coming" signal that interfaces with signals generated by the rotary cam switch 57. Such product coming signals can be generated when an acceptable product 25 moves past a photocell 60 (FIG. 1) located along the conveyor assembly 21 where illustrated or at a location that is farther upstream. Typically, the signals generated by the photocell 60 and by the rotary cam switch 57 are transmitted to a programmable controller or the like (not shown). The controller commands the lifter assembly 26 to either raise or lower the upstanding portions 32 at the appropriate times. The controller will give the "raise" command only if two signals are received, the first signal being an indication from photocell 60 that an acceptable product 25 is on its way to the transfer portion 23 of the conveyor assembly 21, and the second signal being that the carriage 36 is at the proper position to interface with the raised upstanding portions 32. If the first signal is not received, the upstanding portions 32 will not be raised when the carriage 36 is properly positioned, and an incomplete product will pass through the transfer portion 23 and move to the pass-through portion 24 rather than be lifted off of the transfer portion 23 by the comb assembly 28.

Regarding the interfacing of the lifter assembly 26 and the carriage 36, before the shuttle frame or carriage 36 reached its rightwardmost position (FIG. 4), the rotary cam switch 57 had signalled the lifter assembly 26 to move to its lowered orientation. This lowered orientation continues while the carriage 36 moves toward the left until such time as the carriage 36 has been moved by the oscillator drive asembly 45 to the orientation shown in FIG. 5, at which time the oscillator drive assembly 45 indexes the rotary cam switch 57 to the position at which it has been set for signalling the raising of the lifter assembly 26, as shown in FIG. 6.

The raised orientation of the lifter assembly 26 continues during the FIG. 7 orientation and until such time as the comb assembly 28 is completely beneath the product 25 resting on the upstanding portions 32 of the lifter assembly 26, which position is illustrated in FIG. 8. At that time, the rotary cam switch 57 provides a signal to lower the lifter assembly 26 to its lowered position illustrated in FIG. 9, and the product 25 becomes fully supported by the comb assembly 28 as shown in FIG. 9. Oscillator drive assembly 45 will subsequently move the carriage 36 toward the right until the comb assemblies 28 are on opposite sides of the upstanding portions 32, at which time the rotary cam switch 57 will signal that the carriage 36 is in position for raising of the lifter assembly 26.

The longitudinal passageways 59 between the upstanding portions 32 permit the conveyor belts 31 to clear the upstanding portions 32 of the lifter assembly 26. Additionally, the transverse passageways 61 (FIGS. 1, 2 and 3) between the upstanding portions 32 accommodate passage therethrough of individual tines 62 of each comb assembly 28, which accommodation is illustrated in FIGS. 7 and 8.

Discharge conveyor assembly 29 preferably includes dual conveyor paths that operate substantially independently. More particularly, each conveyor belt 63, 63a can be driven independently of the other, and separate lift assemblies, generally designated as 64, 64a, are provided for raising and lowering the conveyor belts 63, 63a at the location where products 25 are deposited thereonto. Each lift assembly 64, 64a includes a conveyor fork lift 65 and a raising and lowering device, such as the illustrated cylinder and rod assembly 66 which is suitably mounted to the apparatus.

A pair of photocells 67, 68 and 67a, 68a are positioned above the surface of each belt 63, 63a at the location where products 25 are deposited thereonto. During the operation of the apparatus, obstruction of the light path between these photocell pairs, 67, 68 and 67a, 68a will signal, through appropriate circuitry, activation of the respective lift assembly 64, 64a to thereby lower the respective conveyor belt 63, 63a. In operation, such obstruction of the light path will be effected by the presence of a product 25 between a photocell pair 67, 68 and/or 67a, 68a. This obstruction will provide a signal to drop the conveyor belt 63 or 63a and the product 25 situated thereon until such time as this product 25 no longer obstructs the photocell pair. Removal of the obstruction results in the transmission of a signal to cease activation of the lift assembly 64 or 64a to thereby stop the dropping of the product 25. Each photocell pair 67, 68 and 67a, 68a is positioned at a height that is below the bottom surface of the comb assembly 28, as a result of which the product(s) 25 stacked onto the respective conveyor belt 63, 63a will be cleared by the comb assembly 28 as it moves over the top product 25 of a stack of products 70.

Once a stack 70 having a predetermined number of products 25 is formed on a conveyor belt 63, 63a, the discharge conveyor assembly 29 is actuated in order to convey such stack 70 to a desired downstream location for further handling, for example packaging. A suitable system is provided for signalling when a stack 70 of the predetermined size has been completed. The preferred system in this regard is one that monitors the product count. Other systems having different product monitoring bases, such as weight, may instead be provided.

With more particular reference to the product that is most advantageously handled by this apparatus and method, such preferably is composed of an underlayer substrate 71 of cellulosic material such as food packaging paper, with a plurality of food items 72 resting thereon in a generally equally spaced longitudinal side-by-side relationship. Contemplated food items 72 include slices of bacon.

Products such as these have a tendency to develop curled up edges or corners of the paper sheet or substrate 71 which may, if not controlled, project upwardly to a height greater than the bottom surface of the comb assembly 28 which could result in damage and/or undesired movement of such a product during movement of the comb assembly 28 above the top product of a stack 70. This condition is preferably controlled by providing the comb assemblies 28 with tines 62 having opposing extensions 69. The tines 62 and the opposing extensions 69 combine to provide an undersurface that is substantially flat at all positions of the comb assemblies 28 while they slide over a stack 70 in order to minimize the possibility that any raised surfaces could engage such a curled up edge of a product 25 during the oscillating movement of the carriage 36.

It is to be appreciated that this invention can be embodied in various forms and therefore is to be construed and limited only by the scope of the appended claims.

We claim:

1. An apparatus for stacking conveyed products, comprising:

a product conveyor assembly having an on-feed portion and a transfer portion downstream of said on-feed portion;

an oscillating stacking comb assembly, said oscillating stacking comb assembly having a comb assembly and means for oscillating the comb assembly into and out of operative interengagement with said transfer portion of the product conveyor assembly;

a lifter assembly having upstanding portions and means for moving said upstanding portions between a lowered position below said transfer portion of the conveyor assembly and a raised position above said transfer position of the conveyor assembly and above the comb assembly, said upstanding portions being in operative interengagement with said transfer portion of the conveyor assembly and with said comb assembly at said raised position;

a discharge assembly having a product receiving and stacking portion; and said means for oscillating the comb assembly includes means for moving the comb assembly between a location in alignment with said transfer portion of the product conveyor assembly and said receiving and stacking portion of the discharge assembly and wherein said oscillating stacking comb assembly includes a pair of said comb assemblies spaced from each other, further including a timing system for sequencing said comb assembly oscillating means and said lifter assembly moving means with respect to each other, wherein said timing system raises the upstanding portions to their raised position when said pair of comb assemblies straddle the upstanding portions, and wherein said timing system lowers the upstanding portions to their lowered position when one of said comb assemblies meshes with said raised upstanding portions.

2. The stacking apparatus according to claim 1, wherein each of said transfer portion of the conveyor assembly, said comb assembly and said upstanding portions of the lifter assembly provide a generally horizontal support surface for products being stacked by the apparatus.

3. The stacking apparatus according to claim 1, wherein said comb assembly is slidably mounted for oscillating movement between a location above said transfer portion of the conveyor assembly and a location above said product receiving and stacking portion of the discharge assembly.

4. The stacking apparatus according to claim 1, wherein said conveyor assembly includes means for stopping same before said moving means of the lifter assembly raises the upstanding portions to said raised position and when said comb assembly is outside of the pathway between the lowered position and the raised position of the upstanding portions.

5. The stacking apparatus according to claim 1, wherein said upstanding portions of the lifter assembly are longitudinally spaced from each other to accommodate passage of the transfer portion of the conveyor assembly therethrough, and wherein said upstanding portions are transversely spaced from each other to accommodate passage of tines of said comb assembly therethrough.

6. The stacking apparatus according to claim 1, wherein said means for oscillating the comb assembly includes an intermittent motion mechanism that directs the oscillating stacking comb assembly.

7. The stacking apparatus according to claim 1, wherein said means for oscillating the comb assembly moves the comb assembly through a defined pattern including positive acceleration, negative acceleration, constant velocity, at-rest and directional change segments.

8. The stacking apparatus according to claim 1, wherein said means for oscillating the comb assembly moves the comb assembly through a defined pattern including a sequence of segments including at-rest, slow positive acceleration, slow negative acceleration, constant velocity, rapid positive acceleration, rapid negative acceleration, at-rest, and direction reversal segments.

9. The stacking apparatus according to claim 1, further including a stripper bar positioned along the oscillating pathway of the stacking comb assembly, said stripper bar having spacings to accommodate passage of tines of the comb assembly therethrough.

10. The stacking apparatus according to claim 1, wherein said means for moving the upstanding portions of the lifter assembly includes a controller that directs movement of the upstanding portions to said raised position in response to a combination of signals including a signal that a product is properly positioned for timed movement to said transfer portion of the conveyor assembly and a signal that said comb assembly is positioned for movement above the transfer portion and through the upstanding portions.

* * * * *